US012342219B2

United States Patent
Winder et al.

(10) Patent No.: US 12,342,219 B2
(45) Date of Patent: Jun. 24, 2025

(54) MINIMIZING OVER THE AIR DATA TRANSMISSION FOR WIRELESS BATTERY MONITORING SYSTEMS

(71) Applicant: Cypress Semiconductor Corporation, San Jose, CA (US)

(72) Inventors: Scott Winder, Novi, MI (US); Victor Zhodzishsky, Potomac, MA (US)

(73) Assignee: Cypress Semiconductor Corporation, San Jose, CA (US)

( * ) Notice: Subject to any disclaimer, the term of this patent is extended or adjusted under 35 U.S.C. 154(b) by 863 days.

(21) Appl. No.: 17/540,043

(22) Filed: Dec. 1, 2021

(65) Prior Publication Data
US 2022/0417792 A1 Dec. 29, 2022

Related U.S. Application Data

(60) Provisional application No. 63/215,200, filed on Jun. 25, 2021.

(51) Int. Cl.
*H02J 7/00* (2006.01)
*B60L 58/10* (2019.01)
(Continued)

(52) U.S. Cl.
CPC .............. *H04W 28/06* (2013.01); *B60L 58/10* (2019.02); *H02J 7/0047* (2013.01); *H04L 1/0061* (2013.01); *H04L 1/18* (2013.01)

(58) Field of Classification Search
CPC ....... H04W 72/12; H04W 74/02; H04W 8/18; H04W 80/02; H04W 76/15;
(Continued)

(56) References Cited

U.S. PATENT DOCUMENTS

2017/0331577 A1* 11/2017 Parkvall ............... H04B 7/0848
2017/0331670 A1* 11/2017 Parkvall ............... H04L 41/0816
2019/0242949 A1* 8/2019 Lemkin ................. H01M 10/42

* cited by examiner

*Primary Examiner* — Binh C Tat

(57) ABSTRACT

Disclosed are methods and systems for reducing wireless data traffic in a battery management system. A wireless battery management system includes peripheral devices (PDs), each coupled to a battery module having associated battery cells and is operable to receive battery measurements from such associated cells. The system also includes a central device (CD) operable to receive battery measurements from the PDs via a wireless network. The system also includes a first data processing unit (DPU) coupled with a first one of the PDs and communicatively interposed between the first PD and the wireless network. The first DPU is operable to (i) receive a first data packet from the first PD, (ii) if the first data packet passes verification, compress the first data packet and add a protection code to the first data packet, and (iii) send the compressed first data packet with the protection code to a second DPU via the wireless network. The second DPU is coupled with the CD and communicatively interposed between the CD and the wireless network. The second DPU is operable to (i) from the wireless network, receive the compressed first data packet with the protection code, (ii) if the compressed first data packet passes verification, decompress the compressed first data packet to obtain the first data packet, and (iii) send the decompressed first data packet to the CD.

21 Claims, 11 Drawing Sheets

(51) Int. Cl.
  *H04L 1/00* (2006.01)
  *H04L 1/18* (2023.01)
  *H04W 28/06* (2009.01)

(58) Field of Classification Search
  CPC ... H04W 74/0833; H04W 48/12; H04W 4/00; H04W 84/18; H04W 16/02; H04W 88/06; H02J 13/0002; H02J 13/00022; H02J 7/0047; B60L 53/305; B60L 53/66; B60L 53/67; B60L 53/80; B60L 53/68; B60L 58/10; B60L 2240/547; B60L 3/0046; B60L 53/65
  USPC .................................................. 320/126–134
  See application file for complete search history.

MINIMIZING OVER THE AIR DATA TRANSMISSION FOR WIRELESS BATTERY MONITORING SYSTEMS

CROSS-REFERENCE TO RELATED APPLICATIONS

This application claims the benefit of prior application U.S. Provisional Application No. 63/215,200, filed 25 Jun. 2021, which application is herein incorporated by reference in its entirety for all purposes.

TECHNICAL FIELD

The subject matter generally relates to the field of battery management systems and techniques. More particularly the present disclosure relates to safely and wirelessly monitoring multiple battery cells of an electric vehicle, as well as other systems.

BACKGROUND

In certain automobile system applications and other applications, functional safety requires a high level of reliability and safety for their software and component systems. ISO 26262 represents the safety-critical standard in the automotive industry with which systems must comply by going through an overall safety process. In order to develop safety-compliant systems, ISO 26262 imposes a functional safety cycle to verify the compliance of a product from its conception to decommission. That is, this protocol generally requires that these systems provide functional safety, which is defined as the absence of unreasonable risk due to hazards caused by the malfunctioning behavior.

ISO 26262 uses the concept of Automotive Safety Integrity Levels (ASILs) to classify the strictness of safety requirements with respect to a system or subsystem. ASILs are fully dedicated to the safety of the driver and road users. SILs are used to allocate safety requirements to hazardous components of critical systems to make sure that their design is composed of safety-critical functions. The Wireless Battery Management System (WBMS) of an electric vehicle requires ASIL D, which is the most stringent safety level. Thus, the WBMS components that implement critical functions are designed as ASIL D compliant.

In view of the foregoing, there is a current demand for a Wireless Battery Management System that can safely implement monitoring and managing of multiple battery cells. It would also be beneficial for achieving ASIL D compliance for WBMS components that implement critical functions.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Methods and systems for reducing wireless data traffic in a battery management system are disclosed. In one embodiment, a wireless battery management system includes a plurality of peripheral devices (PDs), each coupled to a battery module having a plurality of associated battery cells and is operable to receive a plurality of battery measurements from such associated cells. The system also includes a central device (CD) operable to receive the plurality of battery measurements from the PDs via a wireless network. The system also includes a first data processing unit (DPU) coupled with a first one of the PDs and communicatively interposed between the first PD and the wireless network. The first DPU is operable to (i) receive a first data packet from the first PD, (ii) if the first data packet passes verification, compress the first data packet and add a protection code to the first data packet, and (iii) send the compressed first data packet with the protection code to a second DPU via the wireless network. The second DPU is coupled with the CD and communicatively interposed between the CD and the wireless network. The second DPU is operable to (i) from the wireless network, receive the compressed first data packet with the protection code, (ii) if the compressed first data packet passes verification, decompress the compressed first data packet to obtain the first data packet, and (iii) send the decompressed first data packet to the CD. In a Bluetooth application, the CD and PD may each include a wireless component.

In a specific implementation, the PDs, the CD, the first DPU, and the second DPU meet the requirements of the Automotive Safety Integrity Level (ASIL) D protocol, and the CD comprises the second DPU and the first PD comprises the first DPU. In another aspect, the first data packet received by the first DPU includes a protection code in the form of an original CRC (Cyclical Redundancy Check) code, and the first DPU is also operable to determine whether the first data packet passes verification by generating a new CRC code from the first data packet's contents and comparing such new CRC code to the original CRC code. In this example, the protection code generated by the first DPU for the compressed first data packet is in the form of an original cyclic redundancy check (CRC') code, and the second DPU is operable to determine whether the compressed first data packet passes verification by generating a new CRC' code from the compressed first data packet's compressed contents and comparing such new CRC' code to the original CRC' code. In another embodiment, the plurality of PDs, the CD, the first and second DPU, and the wireless network of wireless transceivers are each coupled with a mesh network.

In another embodiment, the first PD is operable to send multiple first data packets in case one or more of the first data packets are lost during transmission. In another example, the first DPU is operable to send a request to the first PD for resending the first data packet if verification fails for such first data packet. In yet another embodiment, the first data packet received by the CD from the second DPU is identical to the first data packet sent by the first PD. In one aspect, the wireless battery management system forms part of an electric or hybrid vehicle. In another implementation, each battery module is stored for later deployment in an electric or hybrid vehicle.

In an alternative embodiment, specific ones of a plurality of other DPUs are coupled with specific other ones of the plurality of PDs and communicatively interposed between each of the other PDs and the wireless network of wireless transceivers, and the other DPUs are operable to (i) receive a plurality of other data packets from their associated PDs, (ii) compress such plurality of other data packets and add a protection code to such plurality of other data packets, and (iii) send the compressed other data packets with their protection codes to the second DPU via the wireless network of wireless transceivers. In this aspect, the second DPU is further operable to repeat the operations for receiving, decompressing, and sending with respect to the compressed other data packets. In a further aspect, the first data packet and the other data packets comprise a plurality of battery measurements for the plurality of cells of the plurality of battery modules. In yet another further aspect, the plurality of battery measurements comprise an average measurement for each of the battery modules' battery cells and a deviation from such average measurement for each of the battery modules' battery cells. In another aspect, the plurality of battery measurements comprises a first measurement for a first one of each of the battery modules' battery cells and a deviation from such first measurement for each of the battery modules' other battery cells. In another aspect, the first data packet and the other data packets comprise the plurality of battery measurements for a plurality of cells of a plurality of battery modules, wherein the plurality of battery measurements comprises at least a first measurement value for a first one of the battery modules' battery cells and a deviation from a previous measurement value for a second one of the battery modules' battery cells.

In another implementation, the CD is further operable to (i) send one or more messages to each of the plurality of PDs to facilitate performance of a synchronous action comprising an interaction of each of the plurality of PDs with their respective one or more of the associated battery modules, wherein the one or more messages comprise a time stamp associated with a reference time, measured by a clock of the CD, associated with receiving the time synchronization request from the respective PD and (ii) receive the first and other data packets from the plurality of PDs, wherein each of the first and other data packets is generated, in connection with the synchronous action performed by each of the plurality of PDs or a device associated with such PD.

In another example, the CD is further operable to (i) send a first message to the first PD of the plurality of PDs, the first message comprising a first indication of time of the synchronous action, the first indication of time defined relative to a predefined first communication time for the first PD, (ii) send a second message for a second PD of the plurality of PDs, the second message comprising a second indication of time of the synchronous action, the second indication of time defined relative to a predefined second communication time for the second PD, the second communication time being different than the first communication time, and (iii) receive the first and other data packets from the first and second PDs, wherein each of the first and other data packets is generated, in connection with the synchronous action performed by each of the first and second PD or a device associated with such first and second PD.

An alternative implementation pertains to a method for managing wireless communication in a battery management system comprising a plurality of peripheral devices (PDs), a central device (CD), a first data processing unit (DPU), and a second DPU. The method includes (i) at the first DPU, receiving a first data packet from the first PD, (ii) if the first data packet passes verification at the first DPU, compressing the first data packet and adding a protection code to the first data packet, (iii) from the first DPU, sending the compressed first data packet with the protection code to the second DPU via a wireless network of wireless transceivers, (iv) from the wireless network of wireless transceivers and at the second DPU, receiving the compressed first data packet with the protection code, (v) if the compressed first data packet passes verification at the second DPU, decompressing the compressed first data packet to obtain the first data packet, and (vi) sending the decompressed first data packet from the second DPU to the CD. In one aspect, the first data packet and the other data packets comprise the plurality of battery measurements for a plurality of cells of a plurality of battery modules, and the plurality of battery measurements comprises at least a first measurement value for a first one of the battery modules' battery cells and a deviation from a previous measurement value for a second one of the battery modules' battery cells These and other aspects are described further below with reference to the figures.

DETAILED DESCRIPTION OF EXAMPLE EMBODIMENTS

In the following description, numerous specific details are set forth in order to provide a thorough understanding of the inventive subject matter. The present disclosure may be practiced without some of these specific details. In other instances, well known process operations have not been described in detail to not unnecessarily obscure the inventive subject matter. While the inventive subject matter will be described in conjunction with the specific embodiments, it will be understood that it is not intended to limit the scope of the inventive subject matter to the embodiments.

Figure 1:
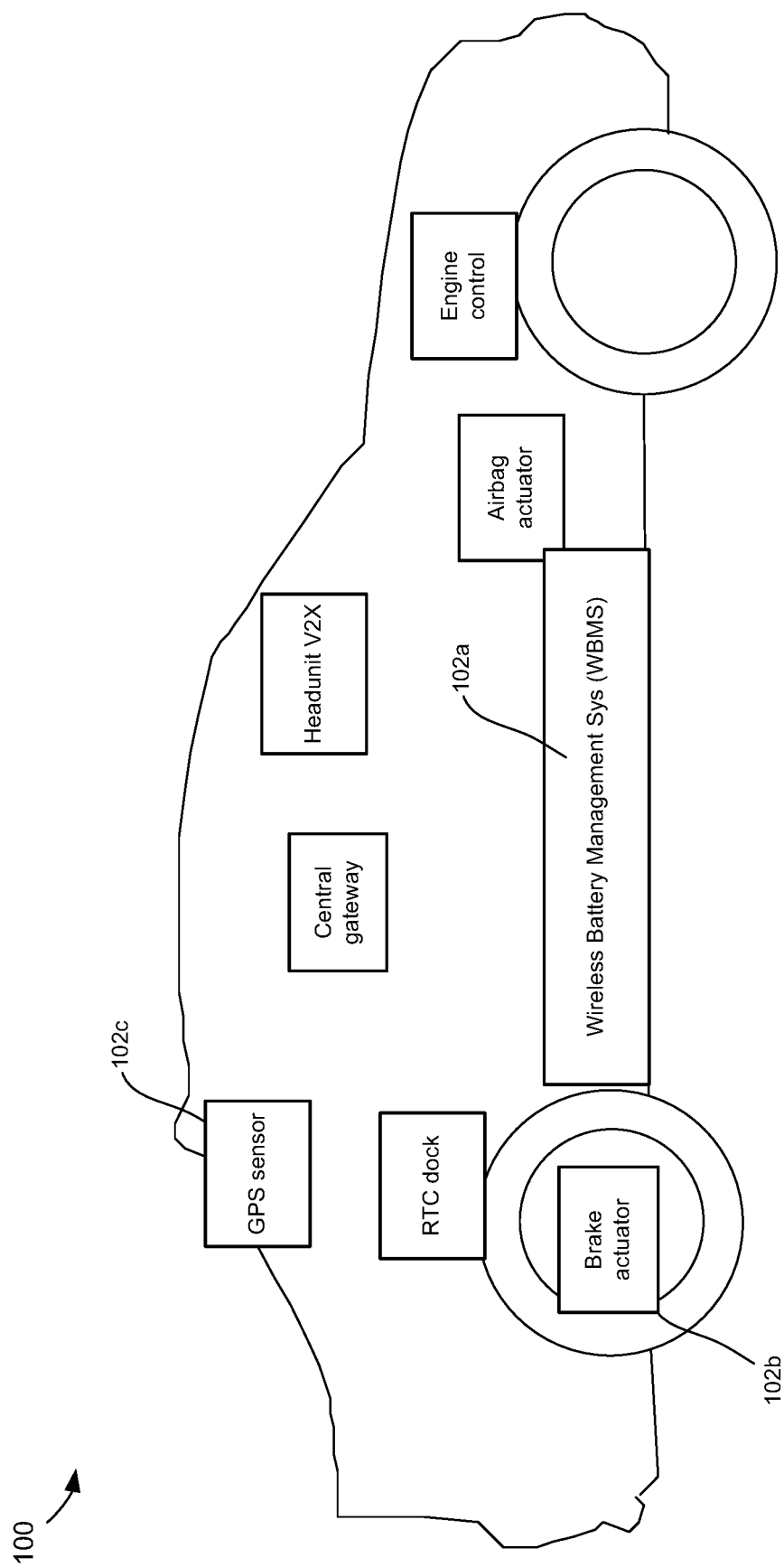
FIG. 1 is a diagrammatic representation of an electric automobile system in which different ASILs may be applied with respect to specific systems and software in accordance with a specific embodiment of the present disclosure.

FIG. 1 is a diagrammatic representation of an electric automobile system 100 in which different ASILs may be applied with respect to specific systems and software in accordance with a specific embodiment of the present disclosure. For example, the car may include a Wireless Battery Management System (WBMS) 102a, a brake actuator system 102b, and GPS sensor 102c that may be designed with different ASIL levels. The WBMS 102a and brake actuator system 102b may both require ASIL D for their critical functions, while the GPS sensor 102c may require ASIL C. WBMS may also be implemented with respect to battery modules of hybrid vehicles or that are simply stored within a warehouse by way of examples.

Figure 2:
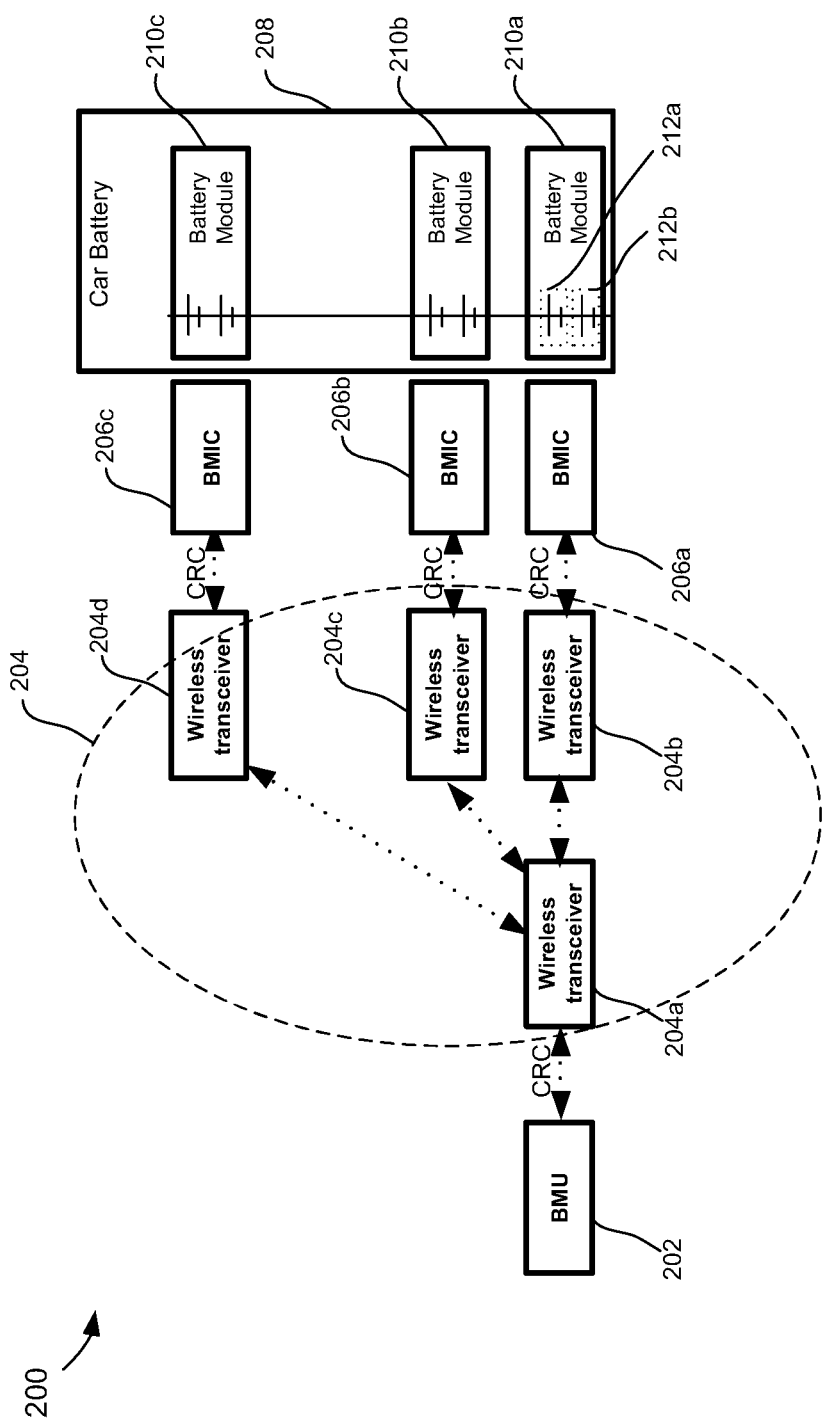
FIG. 2 is a diagrammatic representation of one example of a Wireless Battery Management System (WBMS) having restrictions on wireless transmission data size.

FIG. 2 is a diagrammatic representation of one example of a Wireless Battery Management System (WBMS) 200 having restrictions on wireless transmission data size. In this current design of a WBMS 200, a Battery Management Unit (BMU) 202 may be configured to receive measurement data from multiple Battery Monitoring ICs (BMICs), such as 206a, 206b, and 206c. Each BMIC services multiple battery cells, which form part of an associated battery module (e.g., module 210a, 210b, or 210c of car battery 208). That is, multiple BMICs collect data from multiple battery cells organized in battery modules. Each BMU generally processes data received from all BMICs. The WBMS includes wireless transceivers (e.g., 204a, 204b, 204c, and 204d) that create a network to pass data. Although the BMU, BMIC, and the battery modules may be designed and verified as ASIL D components, the wireless transceivers may be considered as part of a "Black Channel" 204, which is likely not compliant with ASIL D.

In this current design, each BMIC is a simplistic device for measuring multiple cells from its associated battery module. For instance, each BMIC may include an analog-to-digital converter (ADC) for converting battery measurement signals into digital signals, a universal asynchronous receiver-transmitter (UART) for communicating with other devices, etc. Additionally, although the protocol between each BMIC and BMU provides a way for ASIL D components to verify data integrity (e.g., via a Cyclical Redundancy Check or CRC), all data from BMICs is delivered without modifications to the BMU.

In this current design, each BMIC may combine voltage, temperature, and other measurement data from all its associated cells and sends this data without modification to the BMU. For instance, BMIC 206a serves multiple cells, including cell 212a and 212b, of associated battery module 210a. In other implementations, each BMIC may be associated with any number of battery cells, such as 8, 12, or 16 cells. For each cell, a few bytes of data are typically sent, which results in a large amount of data overall being sent over the associated wireless network of devices, such as wireless transceivers 204a-d. This high traffic wireless network utilization limits how many BMICs can be supported in a WBMS and how many cells can be supported per each BMIC.

It is currently not possible or feasible to guarantee an ASIL D safety level in all WBMS components, such as the wireless communication link and controllers. For example, each wireless component would need to go through a lengthy design process for ASIL D certification. This deficit prevents wireless controllers from performing any critical modifications, e.g., compressing, of the data sent over the air. Since the other ASIL D compliant components of the WBMS system (e.g., BMICs and BMU) have already had their functions vetted as ASIL D compliant, it would be difficult and time consuming to design and verify additional ASIL D compliant functions, such as compression. Without a compression feature in any of the WBMS devices, the wireless Black Channel may become congested, resulting in a reduction in reliability and efficiency in data communication. Additionally, the WBMS will have limits on scalability.

Figure 3:
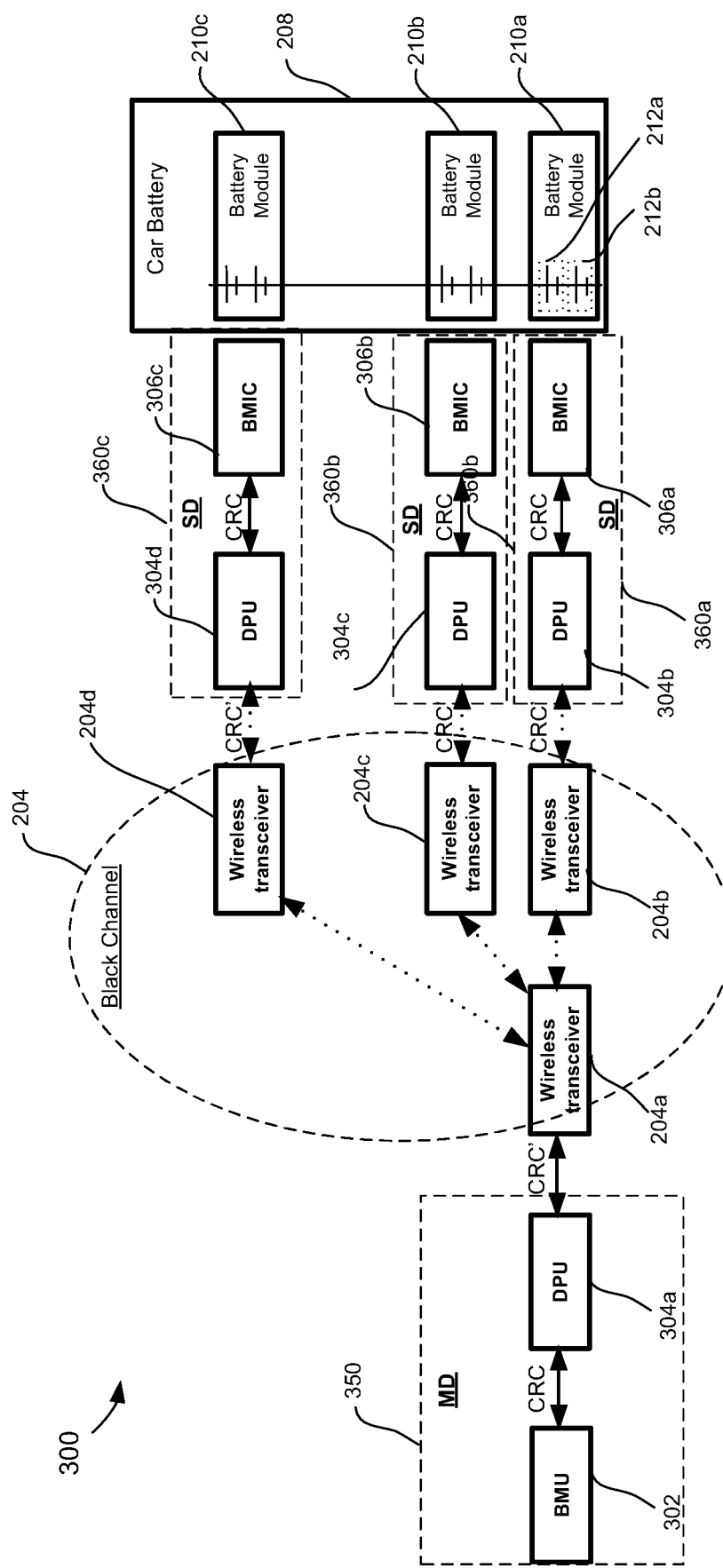
FIG. 3 is a diagrammatic representation of a wireless battery management system (WBMS) in accordance with one embodiment of the present disclosure.

To introduce a compression feature into a WBMS having ASIL D compliant components and a wireless Black Channel, another ASIL D compliant data process unit (DPU) may be introduced between the Black Channel and each of the other ASIL D compliant components that were previously coupled to such Black Channel. FIG. 3 is a diagrammatic representation of a wireless battery management system (WBMS) 300 in accordance with one embodiment of the present disclosure. Components of FIG. 3 that have the same labels as components of FIG. 2 may have similar functions as described further herein. In one example, an ASIL D Data Processing Unit (DPU) is introduced between each BMIC and its associated wireless transceiver on the battery side and between the battery management unit (BMU) and its associated wireless transceiver on the other "command" or "central" side. As shown, DPU 304a is coupled with BMU 302 and wireless transceiver 204a, while DPUs 304b, 304c, and 304d are coupled respectively with BMIC 306a, 306b, and 306c, as well as wireless transceiver 204b, 204c, and 204d. In general, each DPU is introduced and configured to perform compression and decompression, as well as adding and verifying a protection code (e.g., CRC') as described further below.

Processes described herein are not intended to be limited to certain combinations, permutations, or assignment of actors, e.g., whether a particular device actually performs a particular operation. Rather, they are meant to be indicative of some implementations of this disclosure, and one skilled in the art will recognize that some operations may be rearranged for particular applications, some operations need not always be performed, some operations may be omitted, etc.

Figure 4:
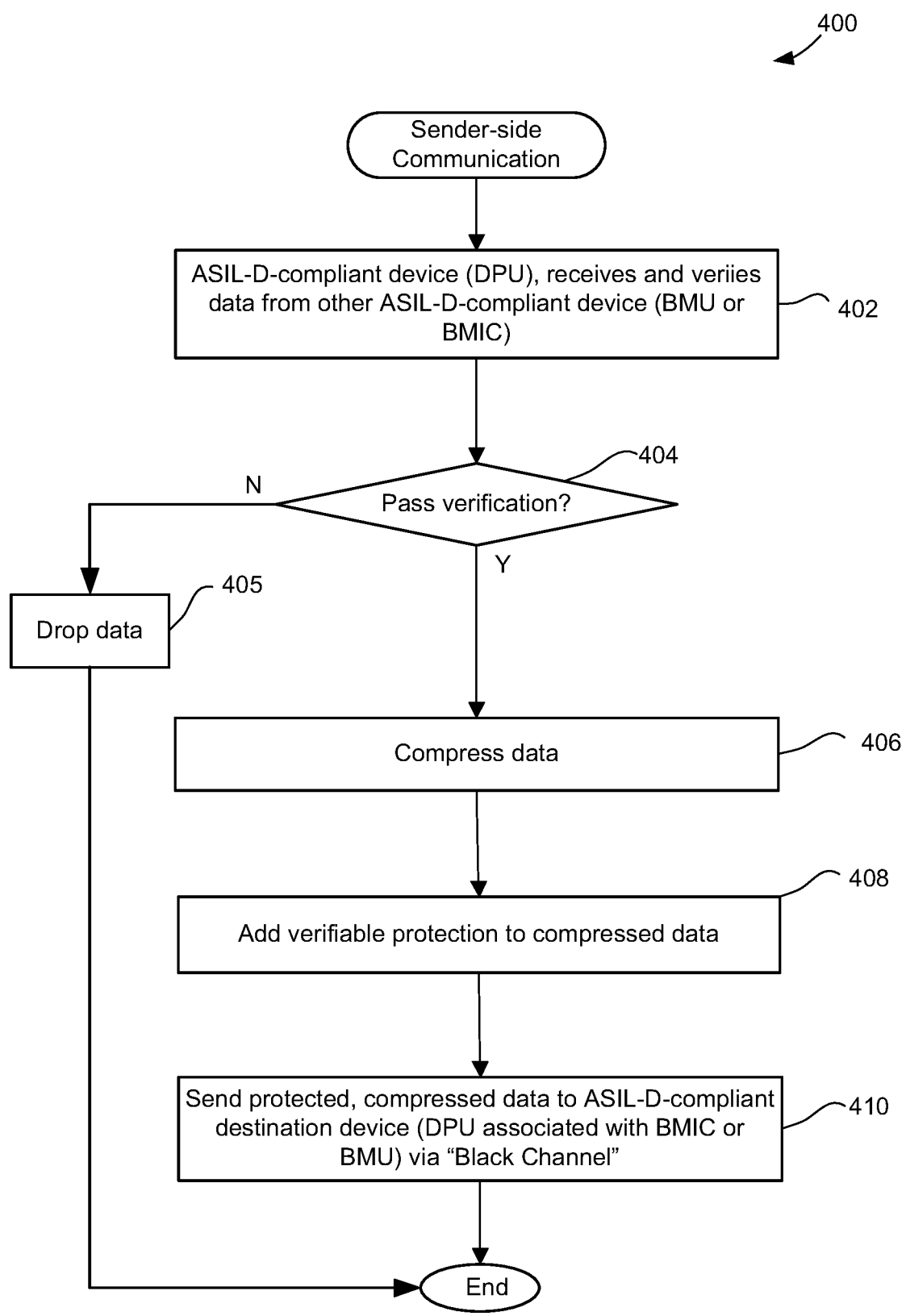
FIG. 4 is a flowchart illustrating a process for sending data in a wireless battery management system (WBMS) having data compression and protection features in accordance with one embodiment of the present disclosure.

FIG. 4 is a flowchart illustrating a process 400 for sending data in a wireless battery management system (WBMS) having data compression and protection features in accordance with one embodiment of the present disclosure. Initially, an ASIL-D-compliant device receives and verifies data from another ASIL-D-compliant device in operation 402. In one example, DPU 304a receives data from BMU 202. In another example, DPU 304b may receive data from BMIC 306a. In either case, the sending device has added a verification or protection code to each data block or packet. For instance, BMU 202 generates a cyclic redundancy check (CRC) code by running a function on each data packet and such CRC code is appended to the data packet. For example, this new CRC value can be generated based on the remainder of a polynomial division of the compressed data contents. On the battery side, each BMIC may also send a data packet with a generated and appended CRC.

Referring back to FIG. 4, it may then be determined whether the data has passed verification in operation 404. Any suitable verification process may be performed to verify the reliability of the received data. In one example, each received packet of data will include some form of verifiable protection, such as protection code. For instance, a short CRC value that is based on the remainder of a polynomial division of the data contents may be calculated and appended to the data packet before sending such data packet from the $1^{st}$ ASIL-D device to the $2^{nd}$ ASIL-D device. A CRC verification method is particularly good at detecting common errors caused by noise in transmission channels. After the $2^{nd}$ ASIL-D device receives such data packet with its CRC, the receiving ASIL-D device repeats the CRC calculation to generate a new CRC value from the data contents. This new CRC value may then be compared to the original and appended CRC value, resulting in the verification passing if the new CRC value matches the appended CRC.

If verification fails, the data packet may simply be dropped or ignored at operation 405, and the process 400 ends. Additionally, the receiving device may notify the sending device that the data verification failed (e.g., was corrupted) and request that the data be resent. The receiving device may simply do nothing and wait for a duplicate data packet from the sender. Since compression is to be implemented on the data in the WBMS system (as described further below), multiple duplicate data packets may be sent, in case some of them may be lost in a wireless system.

If the received data packet passes verification, the receiving device (e.g., DPU) may then compress the data in operation 406. In one example, DPU 304*a* may compress data from BMU 302. In another example, DPU 304*b* may compress data from BMIC 306*a*. Any suitable number and type of compression algorithm or hardware may be used. By way of examples, a lossless compression algorithm may take the form of one or more of the following: a general-purpose Lempel-Ziv algorithm, or a hardware specific method. In one embodiment, the WBMS may also utilize system specific compression. For example, instead of sending N 16-bit temperature measurements, the sender may send a 16-bit mean and N 8- or even 4-bit deltas from the mean value. On the receiving side, the DPU can reconstruct original values before passing to BMU.

After compression, the receiving device may then add its own verifiable protection code to the compressed data in operation 408. For instance, the receiving device calculates a CRC value from the compressed data and appends the CRC code to the compressed data. The original CRC value may also be removed from the data prior to compression.

The receiving device may then send the protected, compressed data to its ASIL-D-compliant destination device (DPU that is associated with BMIC or BMU) via the Black Channel in operation 410, and the sending process 400 ends. For instance, DPU 304*a* sends compressed data protected with CRC' via Black Channel 204 to DPU 304*b*, which is coupled with destination device BMIC 306*a*. In another example from the battery side, DPU 304*b* sends compressed data with CRC' via Black Channel 204 to DPU 304*a*, which is also coupled with destination device BMU 202.

Figure 5:
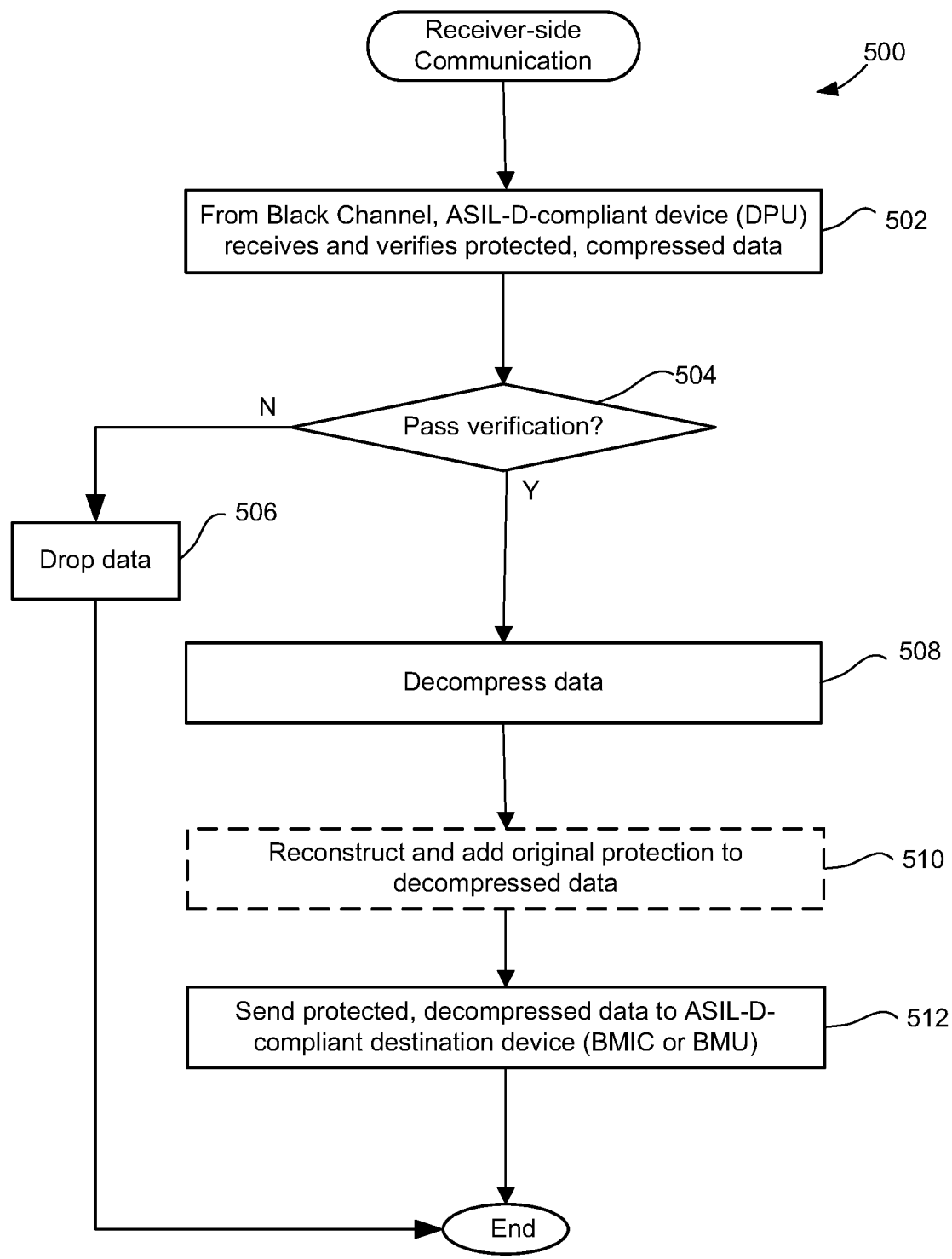
FIG. 5 is a flowchart illustrating a process for receiving data in a wireless battery management system (WBMS) having data compression and protection features in accordance with one embodiment of the present disclosure.

Protected compressed data may be sent from a 1$^{st}$ ASIL-D-compliant component on one side of the WBMS to a 2$^{nd}$ ASIL-D-compliant component on the other side of the WBMS. For instance, protected, compressed data may be sent from a DPU on the battery side to a DPU on the management side or visa versa. In both directions, one DPU will send protected compressed data to another receiving DPU via the Black Channel. FIG. 5 is a flowchart illustrating a process 500 for receiving data in a wireless battery management system (WBMS) having data compression and protection features in accordance with one embodiment of the present disclosure. Initially from the Black Channel, an ASIL-D-compliant device (DPU) receives and verifies protected and compressed data in operation 502. For instance, DPU 304*b* receives compressed data that is protected with CRC' and destined for BMIC 306*a*, and DPU 304*b* then verifies the integrity of such received data by comparing a new CRC' that is generated from the compressed data contents with the originally received CRC'.

If the verification fails in operation 504, the receiving device may drop the received data in operation 506. In other words, the receiving device may ignore and not process the received data packet. In another implementation, an error correction process may be executed as described above. If the verification passes in operation 504, however, the receiving device may then decompress the received data in operation 508. It is understood that both the sending and receiving devices (e.g., DPUs) are configured with compatible compression and decompression algorithms as described further herein.

After the data is decompressed, the receiving device may also reconstruct the original protection (e.g., CRC) for the decompressed data contents in operation 510. In other embodiments, the CRC have previously been compressed along with the other data contents so that the CRC is then decompressed along with the other data contents. In this later example, the receiving device does not need to reconstruct the CRC for the decompressed data contents.

The receiving device may then send the protected, decompressed data to the ASIL-D-compliant destination device in operation 512, and the procedure 500 ends. For instance, DPU 304*a* sends decompressed data protected with CRC to BMU 302. In another example on the battery side, DPU 304*b* sends decompressed data with CRC to BMIC 306*a*, which is also coupled with associated battery module 210*a*. In sum, the BMU 302 sees data exactly as if received from the sending BMIC, while each receiving BMIC sees data exactly as if received from the BMU 302.

In a specific implementation, the DPUs are configured as separate devices from the management devices (e.g., BMU) and battery monitoring IC (BMIC) devices. As discussed above, one reason for this separation is the existence of already-designed ASIL-D compliant devices for the battery management and measurement functions. Integrating the compression and decompression features into the BMU or BMIC devices would entail a significant amount of work to achieve ASIL-D compliance for all the integrated functions of the redesigned BMU and BMICs. In the illustrated example, each DPU and its added functions may be independently assessed to conform to ASIL-D. In one implementation, each DPU may be implemented as a separate chip, e.g., as one of the cores of a dual core chip. In the future, compression and decompression features may be integrated into the battery management and measurement devices (e.g., BMU and BMIC devices).

The battery monitoring and measurement processes and systems described herein may be implemented with respect to consumer operation of an electric vehicle, as well as with respect to stored battery modules (e.g., within a manufacturing warehouse). In the former example, the battery cells may be monitored for prevention of critical failure, such as explosion, burning, or stoppage. If a measurement goes out of specification, a command may be sent to the failing battery module (or entire vehicle) to go into safety mode. If there is no communication within a predetermined time or communication tries, a safety mode may also be initiated.

In the battery storage example, various battery measurements may be broadcasted from each battery module, e.g., using one or more Bluetooth low energy transmitters/beacons. These measurements may be collected and monitored by any suitable data processing device. Thus, multiple battery cells of each module can be efficiently monitored in a wireless system that includes compression. For instance, the state of charge (SOC) or state of health (SOH) measurements may be read from each cell and sent compressed over the WBMS. Battery measurements may include voltage, temperature, power, various diagnostic data provided by a BMICs, etc. This information may be used to select the battery modules with the most optimum charge levels or similar levels for placement and use in automobiles, in home battery systems, or in other battery applications.

In general, each measurement packet may include an address for the specific module, an index for the specific cell in such module, and a measurement for the specific cell. In another implementation, all of the cells of a particular module will likely have the same voltage measurement. Instead of including voltage values for every cell, the measurement data may include one measurement value for one cell and delta values (e.g., deviations from such measurement) for the other cells in the same module. In another embodiment, the measurement data may include an average measurement for the cells in a module and deviation/delta measurements for the other cells of such module.

Regardless of specific application, reducing over the air traffic will allow an increase in the number of cells that the wireless BMS can support. Certain embodiments can enable better performance and better over the air utilization.

It is understood that the features described herein may be implemented in any number and type of devices and configurations. As shown in FIG. 3, BMU 302 and DPU 304*a* may form part of Central Device (CD) 350 for managing multiple Peripheral Devices (PDs), e.g., 360*a-c*, which each comprise a DPU and BMIC pair. In a Bluetooth application, the CD and PD would each also include a wireless component. As described herein, it is understood that DPU and BMU devices may take the form of separately packaged devices or modules integrated into a single packaged device. Likewise, the DPU and BMIC device may form be separated device or a single integrated device.

In general, a CD can communicate with multiple PDs. Typically, data may be transferred between a CD and a specific PD during a time allocated for the specific PD-CD communication link. At a designated time, a PD can tune-in to receive messages and data from the CD and, in turn, communicate data to the CD. Additionally, a CD can sometimes use a broadcast mode, in which the same data is communicated to multiple PDs simultaneously.

Certain wireless personal area networks (WPAN), such as Bluetooth (BT), can use the 2.4 GHz radio frequency band to provide wireless connection between the CD and multiple PDs in the WBMS. Bluetooth Low Energy (BLE) networks have communication ranges that are similar to that of BT networks but have a considerably smaller power consumption and cost. BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology. Additionally, certain embodiments may be implemented using other WPANs besides Bluetooth, such as Zigbee, or other short range protocols, wireless local area network (LAN) protocols, and using other frequency bands.

Performance of electric vehicles may depend on uniformity of charging and discharging of multiple high-voltage battery cells. Accurate synchronous (simultaneous) measurements of the state of each cell can serve to provide data that can facilitate optimization of battery utilization during acceleration, cruising, braking, and various other maneuvers of the vehicle, as well as data during charging. Such a synchronization could be achieved through a wired connection, which can be used to ensure that all signals are generated, sent and/or, received simultaneously. However, wired connections to a large number of peripheral devices may not only be inconvenient but may be impractical or even unsafe. Therefore, it has become advantageous to deploy wireless sensors/devices that are easier to install, maintain, or replace than wired devices in WBMS applications.

Wireless devices, being largely independent from each other, may have clocks that run with somewhat different speeds compared with other clocks; e.g., different clocks may have a slightly different drift, jitter, etc. It would thus be beneficial to synchronize all of the wireless devices. For example, devices operated using a BT, BLE, or some other wireless network technology, could be synchronized by a suitably prepared signals exchanged between a central device (CD) and various peripheral devices (PDs). In one implementation, the battery management unit (BMU) serves as the CD and is configured to implement the synchronization operations with respect to multiple PDs that include BMICs that are each associated with a battery module and its cells. The synchronization techniques described herein can be deployed in conjunction with the additional compression and protection mechanisms described herein (e.g., with respect to DPUs inserted into the network).

One method of time synchronization may include a PD sending, at a first recorded time ta, a request for a time stamp to the CD. The CD receives the request, generates a Real Time Clock (RTC) time stamp TS, and sends TS back to the PD. The PD receives this response at a second time tb, records this time, and estimates that the master time stamp TS was generated at a halfway time (ta+tb)/2 between the two recorded times. The PD then uses this information to record an estimated mismatch between the two clocks, $\Delta=(ta+tb)/2-TS$. This estimated mismatch can subsequently be used for future synchronization actions. For example, when the PD is instructed by the CD to perform a certain action at time T' (according to the clock of the CD), the PD can add the mismatch to the specified time to determine that the action is to be performed at the time $t'=T'+\Delta$ (by the clock of the PD).

The implied assumption of the above-described synchronization method is that the time interval between sending the request for the time stamp and generating the RTC time stamp by the CD is equal to the time interval between generating the RTC time stamp by the CD and receiving the RTC time stamp by the PD. Because the exact time for transmission and processing of data is subject to various uncertainties (e.g., due to signal obstruction, network interference and noise, etc.), such an assumption may not always be accurate. For example, sometimes transmission from the CD to the PD can take longer than in the opposite direction (or vice versa). On the other hand, requesting multiple RTC time stamps over a period of time and computing an average clock mismatch can take a significant time that may be too long (and potentially suffer from an additional clock drift over longer times).

Some aspects and implementations of the present disclosure address these and other limitations of the existing technology by enabling systems and methods of efficient and accurate clock synchronization in wireless networks (e.g., for performance of synchronous actions). In one example implementation, a CD and a PD may communicate once every connection interval $T_0$; the PD may send a time stamp request at the onset of a connection event to the CD and the CD may record the CD's time stamp TS right after receiving the request. The CD may then wait until the next connection event to communicate the recorded time stamp to the PD. As described in more detail below, the PD may infer the clock mismatch $\Delta$ based on the time stamp time TS and the duration of the connection interval $T_0$.

Once the mismatch Δ has been determined by various PDs, the CD may send instructions with a time of a synchronous action, and multiple PDs may be capable of performing this action synchronously, using the determined mismatches. In another example implementation, the CD may not be communicating the time stamps to the PD. Instead, during initial establishment of the wireless connection between the CD and various PDs, the CD may allocate, to each PD, a connection slot (within the connection interval $T_0$) individually offset from the start of the connection interval. The individual offsets may be known to an application (installed on the CD) that schedules a synchronous action. The application may set a target time for the synchronous action and may communicate, to each PD, during a connection slot allocated to the respective PD, a time that remains until the target time. Using the communicated times, various PDs may be capable of starting the execution of the synchronous action at the same target time. In some implementations, the CD may use advertising broadcasts to communicate the target time for the synchronous action to multiple PDs at the same time. Numerous other implementations and multiple variations of these implementations are discussed below.

Figure 6:
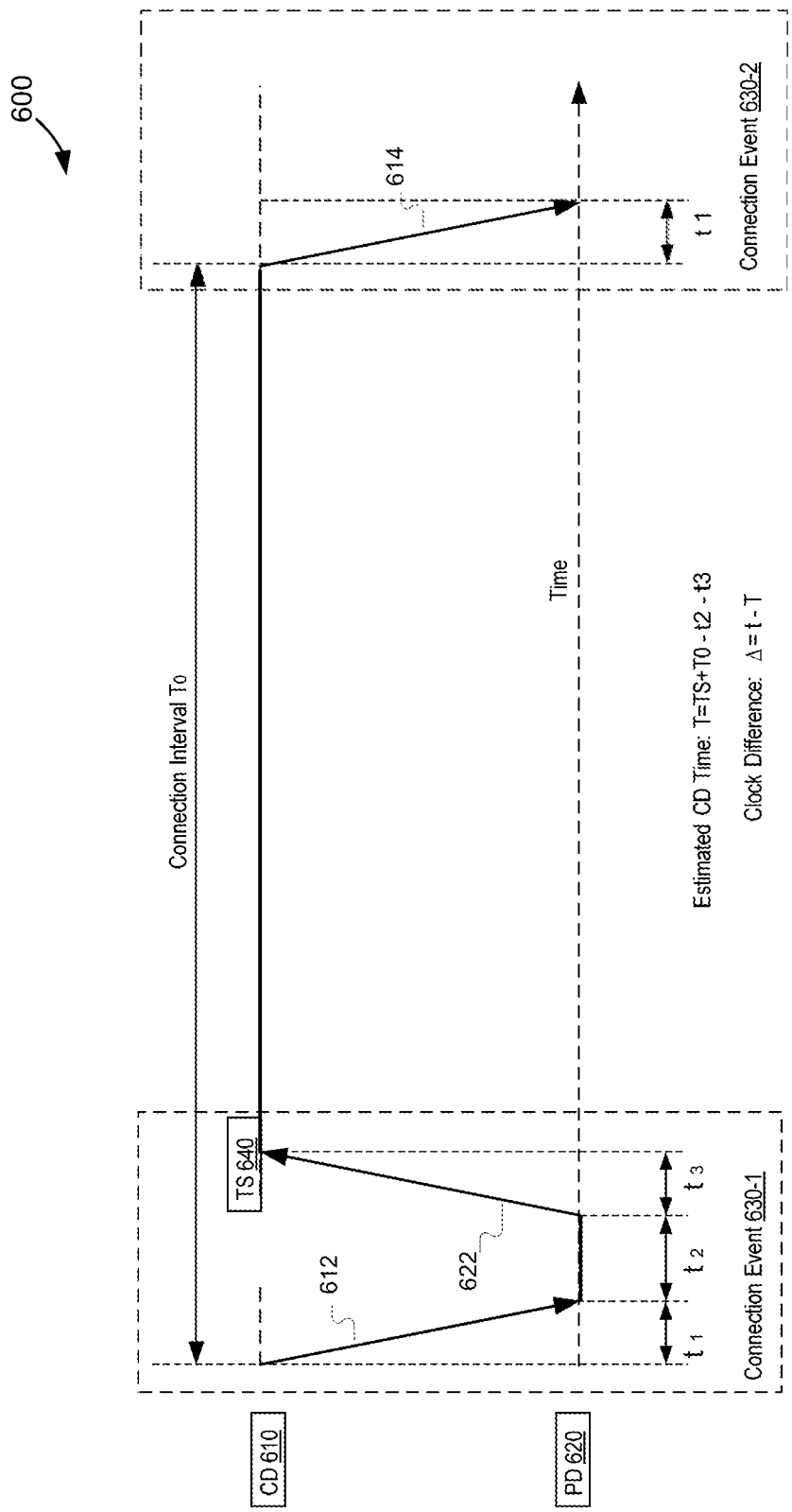
FIG. 6 illustrates an example clock synchronization in a WBMS using a time stamp generated by a central device and a known duration of a connection time interval, in accordance with some implementations.

FIG. 6 illustrates example clock synchronization 600 in a WBMS using a time stamp generated by a central device and a known duration of a connection time interval, in accordance with some implementations. Depicted schematically in FIG. 6 are operations of a central device (CD) 610 and a peripheral device (PD) 620. CD 610 and PD 620 may be a part of a Bluetooth (BT) network, a BT Low Energy (BLE) network, or any other wireless network. CD 610 and PD 620 may have previously established a wireless network connection. Although depicted in FIG. 6, for brevity and conciseness, is a single PD 620, CD 610 would likely be concurrently supporting connections with multiple PDs.

Various devices depicted in FIG. 6 may be communicatively coupled (e.g., via a wired connection, a bus, or wirelessly) with one or more associated devices. In some implementations, PD 620 (and, in some instances, CD 610) may be monitoring a state of the associated device(s) or facilitating operations of the associated device(s). For example, PD 620 (and/or various other PDs that are not shown in FIG. 6) may be associated with one or more cells of a battery (e.g., an automotive battery of an electric vehicle) and may be performing (or facilitating) measurements of a state of the cells of the battery. The measurements may be performed periodically or at times determined by a host controller communicatively coupled to CD 610. PD 620 (and/or various other PDs) may be integrated into a battery pack. The battery may be used to power an electric motor that propels an electric vehicle. As the battery is powering the motor, battery cells may be in a constant state of discharging (and/or charging, e.g., during braking), which may occur differently in different cells. To perform a meaningful and accurate measurements of the state of various cells, various PDs of the wireless network may perform the measurements (or cause the measurements to be performed by associated sensors coupled to the cells) synchronously.

Additionally, the devices in FIG. 6, as well as any Figure described herein, will be operable to perform compression and decompression, as well as a verifiable protection mechanism, for packet contents moving across the wireless network or Black Channel as described further above.

In some implementations, synchronous actions by the PDs are enabled by allowing various devices of the wireless network to determine the difference of their internal clocks with at least one other reference device in the network, e.g., CD 610. The determined clock differences may be used to perform synchronous actions simultaneously on multiple devices. In some implementations, clock synchronization 600 may be facilitated by the specification of a wireless protocol of the CD-PD connection. For example, as may be set by CD 610 during initial establishment of a connection between CD 610 and PD 620, connection events 630-1 and 630-2 may be spaced by a connection interval $T_0$. In the description of FIG. 6 that follows, the reading of the internal clock (e.g., the RTC) of CD 610 is denoted with uppercase T, with various subscripts (as may be used), and the reading of the internal clock of PD 620 is denoted with lowercase t, likewise with various subscripts.

In some implementations, clock synchronization 600 may be achieved as follows. CD 610 may send, at an onset of connection event 630-1, a message 612 to PD 620. Message 612 may include one or more data packets, frames, such as management frames, control frames, a CRC code, and the like. In some implementations, message 612 may be an empty message that includes a header but no data frame.

Although not necessary for messages that do not have a data frame, the above-described compression and protection processes may be performed on any message that contains data contents (e.g., data packets) when such packets are being transmitted to or received from the wireless devices (e.g., Black Channel 204). Before a message is transmitted across the Black Channel to be received by a PD, such packet is also compressed and protected with CRC' as described above. After the message exits the Black Channel, the message can then be verified via CRC' and decompressed if verified before being processed further by PD. The original CRC may also be regenerated and added back to the message prior to being processed by PD as described further above. Although these compression/decompression/protection operations are not described below with respect to the synchronization process so as to simplify the description, it is understood that such compression/decompression/protection operations would be carried out each time a message is to transmitted between each CD and PD pair.

Responsive to receiving message 612, PD 620 may generate a request 622 for a time stamp TS from the RTC of the CD 610 and transmit the generated request to CD 610. Although delivery of message 612 to PD 620, generation of request 622 by PD 620, and transmission of request 622 to CD 610 may be performed over times that are substantially smaller than the duration of the connection interval $T_0$, some delays may be associated with such processes. For example, it may take time $t_1$ for message 612 to be transmitted from CD 610 to PD 620 and be processed by PD 620 (e.g., by PHY Layer and Link Layer of PD 620). It may further take time $t_2$ for PD 620 to generate request 622, transform request 622 into one or more frames, to generate data packet(s) based on the frame(s), and transmit the data packet(s) to CD 610. Additionally, it may take time $t_3$ for request 622 to be received and processed by CD 610.

Upon receiving request 622 from PD 620, CD 610 generates a time stamp 640. The generated time stamp 640 may include current value TS of the RTC of CD 610 at the time when the time stamp 640 is generated. When the next connection event 630-2 occurs, CD 610 may send the generated time stamp 640 to PD 620 in message 614. It may again (as in case of earlier message 612) take time $t_1$ for message 614 to be received by PD 620.

To perform clock synchronization, PD 620 may record its own time t at the time of arrival of message 614 (with the time stamp 640) and perform a comparison, in view of the connection interval, between the value TS of time stamp 640 received from CD 610 and a current value of clock (e.g., RTC) of PD 620. In some implementations, this comparison may be performed as follows. A processing device of PD 620 may infer the current value T of the clock of CD at the time at which PD 620 generated time stamp t in response to receiving message 614. In some implementations, the processing device of PD 620 may infer the current value T as the sum of the time stamp 640 value TS and the duration of the connection interval, $T=TS+T_0$. In some implementations, the processing device of PD 620 may further correct for the time it takes the request 622 to be generated by PD 620, transmitted, and processed by CD 610, and infer the time as, e.g., $T=TS+T_0-t_2-t_3$.

It should be understood that the above formulas are intended as examples and that various other schemes of clock synchronization are possible that are based on the duration of the connection interval, e.g., using different specific equations, accounting for different (or additional) corrections, while still being within the scope of this disclosure.

Having inferred the current clock value T of CD 610, the processing device of PD 620 may then calculate a clock difference (mismatch, offset, etc.), $\Delta=t-T$, and use this clock difference in order to perform various synchronous actions, as may be instructed by CD 610 or scheduled by software or firmware operating on PD 620. Such instructions may be received as part of message 612, message 614, or any other (previous or later) messages communicated by CD 610. Having received an instruction to perform a synchronous action at time T', PD 620 may add the determined clock difference $\Delta$ and identify the accurate time $t'=T'+\Delta$ to perform (or start) the action.

Although certain Bluetooth systems include a CD that always sends a packet first to which each PD replies, the actors shown in FIG. 6 may be reversed in other embodiments, e.g., CD 610 may send a request (e.g., as part of message 612) to PD 620 for a time stamp, and upon receiving the time stamp from PD 620, the CD 610 may perform calculations (similar to the ones described above) to determine the clock difference $\Delta$ between the two devices. Subsequently, when CD 610 generates instructions for PD 620 to perform an action (e.g., synchronously with other PDs of the wireless network), CD 610 may include in the instructions the time of the action that has been corrected in view of the difference $\Delta$. In some implementations there may be a logic unit on PD 620 to detect if a data packet was missed, for example if a time greater than the connection interval $T_0$ (or twice the connection interval $2T_0$, etc.) has passed between PD 610 generating a request 612 and receiving a time stamp 640, and trigger an additional request to CD 610 for a new time stamp. In some implementations, for additional accuracy, the process may be repeated several times and a statistical metric may be used to correct for clock differences, for example, by computing the mean or the mode of the calculated differences $\Delta$.

Figure 7:
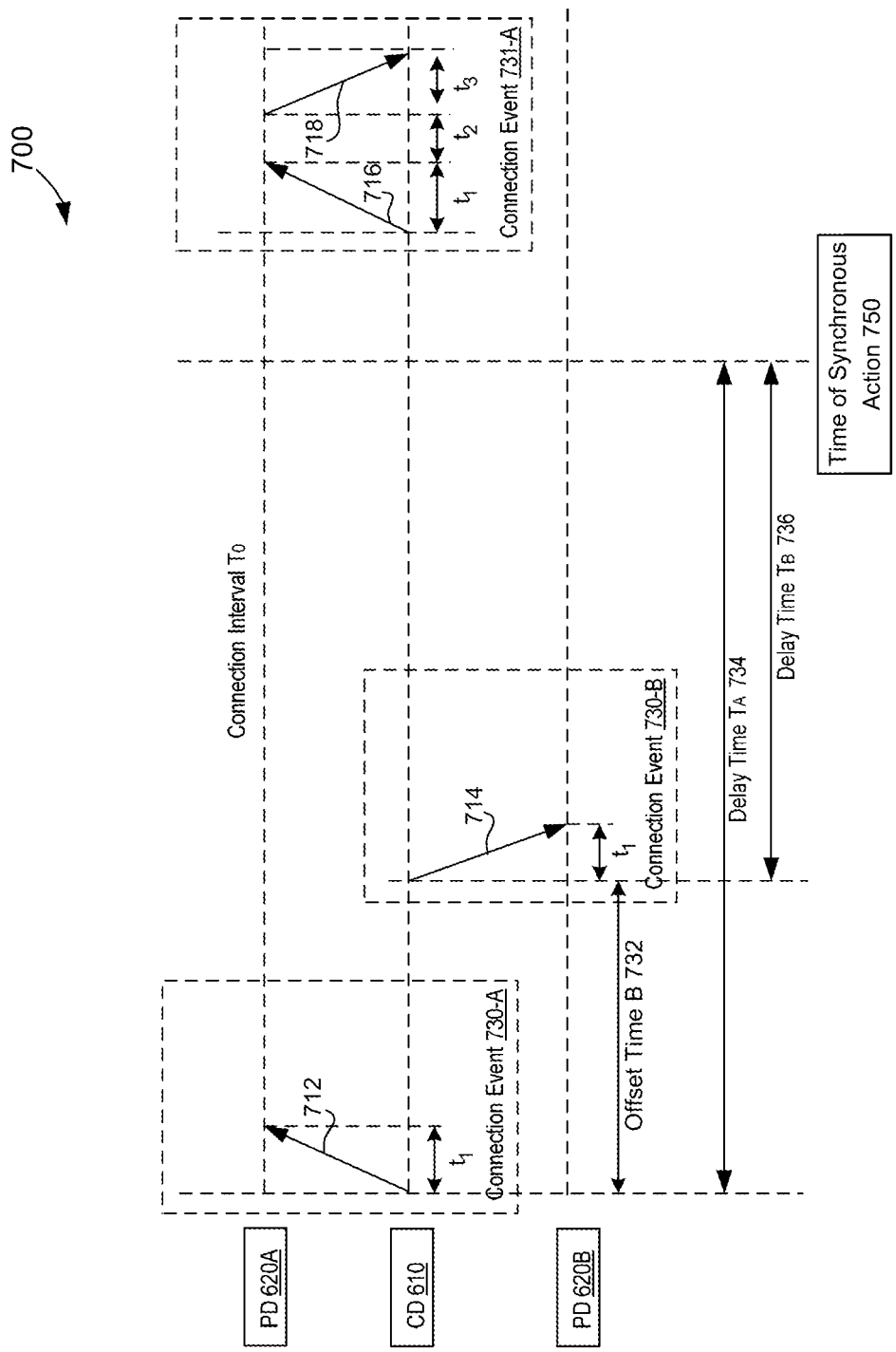
FIG. 7 illustrates an example clock synchronization in a WBMS using scheduled connection events, in accordance with some implementations.

FIG. 7 illustrates an example process 700 of performing a synchronous action in a WBMS using scheduled connection events, in accordance with some implementations. As depicted, clock synchronization may be performed in a system that includes a CD 610 wirelessly connected to multiple PDs 620-X (e.g., PD 620-A, 620-B, etc.), and the CD 610 uses the difference between scheduled communication times with the various PDs 620-X to facilitate a synchronous action at a particular time 750. In FIG. 7, CD 610 schedules times to communicate with each of the various PDs 620-X. Although only two peripheral devices, PD 620-A and PD 620-B are shown for conciseness in FIG. 7, in various implementations the number of peripheral devices need not be limited. In some implementations, the wireless network may be a connected mesh network, such that any device can be designated as the acting CD, and that role can change from device to device over time. Although some information helpful for comprehension of implementations is shown in FIG. 7, it will be understood that other devices, events, and processes not explicitly shown may also be a part of the wireless network and communications thereof, such as other devices associated with (or coupled to) CD 610 or PDs 620-X, wireless communications transmitted by PDs 620-X back to CD 610 during various connection events (e.g., connection events 730-A, 730-B, 731-A, etc.), and the like.

The synchronous action occurring at time 750 may be a measurement of the state of devices associated with the PDs 620-X and/or the CD 610. In one implementation, each PD 620-X is associated with a sensor configured to monitor a cell in the battery of an electric vehicle, or a medical device taking readings from a particular point in the body of a patient, and the like. When the time of synchronous action 750 arrives, some or all devices (e.g., PDs 620-X and/or CD 610) may perform a simultaneous measurement (or any other action), to obtain accurate data characterizing a state of the system being measured (or initiate some other operation).

In some implementations, the synchronous action may instead be a clock synchronization event, wherein all PDs 620-X simultaneously record a RTC time stamp t, compare the recorded time stamp with a time stamp T recorded by CD 610 at the same time and communicated (e.g. broadcasted) to PDs 620-X. Subsequently, PDs 620-X may use the difference T–t of the recorded time stamps in performing future synchronous actions.

In some implementations, CD 610 establishes and programs a communication with a plurality of PDs 620-X. The CD 610 manages the timing of the various connection events 730-X with respective PDs 620-X, for exchanges of data with each PD 620-X every connection interval $T_0$. The CD 610 may, for instance, be in a wireless communication with PD 620-A and PD 620-B. The CD 610 schedules a time to communicate with PD 620-A, and a time to communicate with PD 620-B delayed by Offset Time B 732.

In one non-limiting example, CD 610 sends a message 712 during (e.g., at the start of) connection event 730-A to PD 620-A. The message 712 may include a delay time TA 734 until a future time of synchronous action 750. Message 712 may, as discussed above, contain corrections for air time, processing time, etc., such as those captured by t1. More specifically, the Delay Time $T_A$ communicated by CD 610 may be reduced by the anticipated correction. For example, a Delay Time $T_A-t_1$ may be communicated to PD 620-A. In some implementations, CD 610 may communicate the intended Delay Time $T_A$ whereas the correction may be applied by PD 620-A. During connection event 730-B, CD 610 sends another message 714 to PD 620-B, also containing a Delay Time $T_B$ 736 remaining until the future time of synchronous action 750. Delay Time $T_B$ 736 may be chosen in view of the time between connection event 730-A and connection event 730-B, e.g., in view of the Offset Time B 732.

As depicted in FIG. 7, after the time of synchronous action 750 has passed (and the synchronous action has been performed), CD 610 may communicate again with PD 620-A during one of the subsequent connection events, e.g., connection event 731-A. More specifically, CD 610 may send a new message 716 to PD 620-A, which may contain a new delay time to a second synchronous action (not shown). In addition, PD 620-A may also send data 718 to CD 610. The data may include the results of a measurement conducted by PD 620-A (or a device associated with PD 620-A) in conjunction with the performed synchronous action.

In some implementations, determination of Delay Times $T_A$ and $T_B$ may be performed by a synchronization application executing on CD 610. The synchronization application may determine the time of synchronous action 750, identify time offsets for various PDs 620-X, generate content of messages 712 and 714, collect data from the PDs generated during or in connection with the synchronous actions, and so on. In some devices and wireless networks (e.g., BT and BLE networks), the synchronization application may have no standard access to time offsets, which can be managed by a lower-level mechanisms (e.g., Link Layer) of CD 610. To address such situations, a change to the communication standard used by CD 610 and PDs 620-X may be made. More specifically, after the Link Layer of CD 610 has determined time offsets for various PDs (e.g., during the time the network connections are established), the Link Layer may allow the synchronization application access to the offsets that have been set up.

Figure 8:
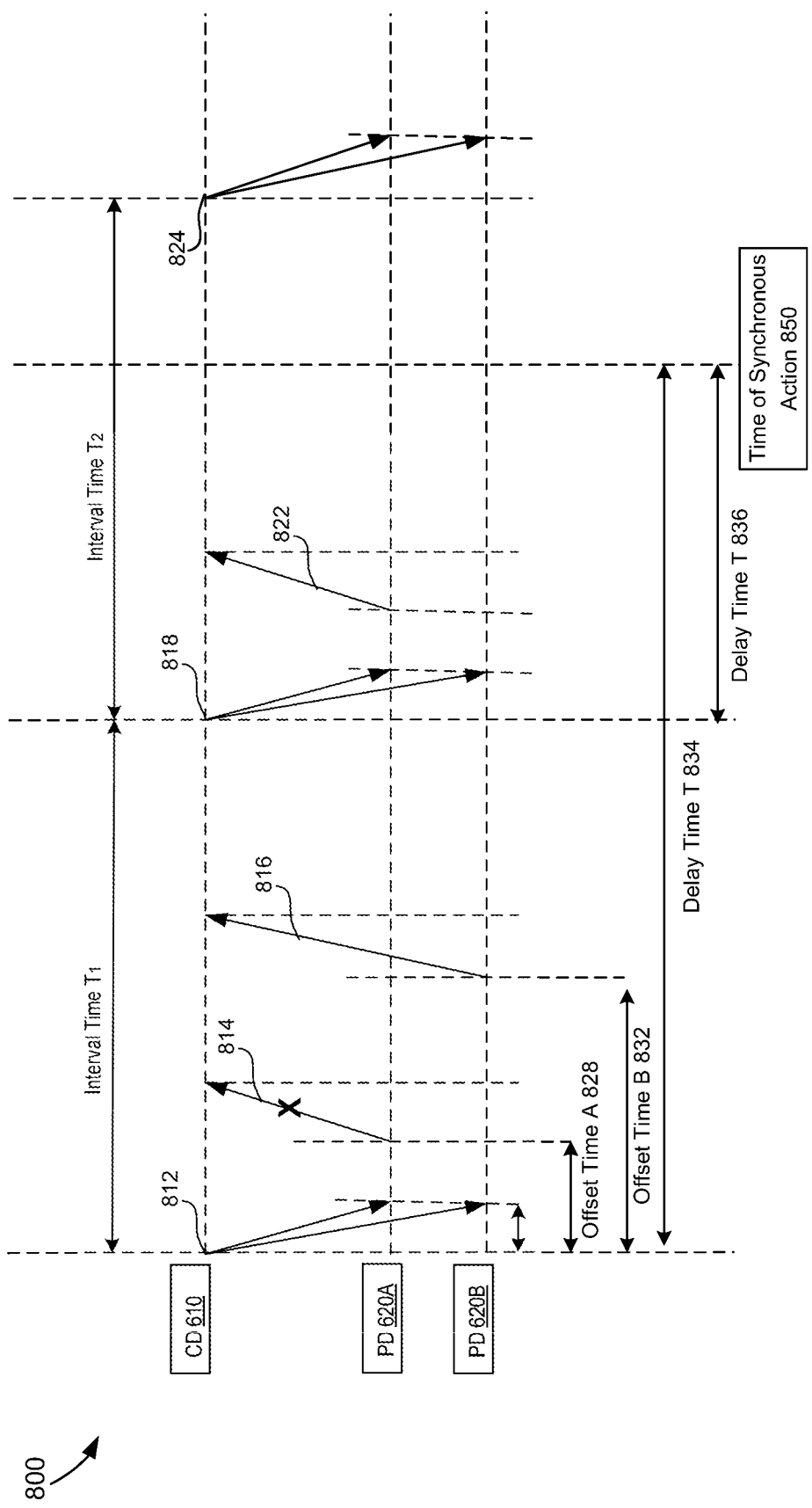
FIG. 8 illustrates an example process for performing a synchronous action in a WBMS using scheduled connection events, with additional protection against packet loss, in accordance with some implementations.

FIG. 8 illustrates an example process 800 for performing a synchronous action in a WBMS using scheduled connection events, with additional protection against packet loss, in accordance with some implementations. It will be understood that while two PDs 620-A and 620-B are depicted in FIG. 8, the number of PDs may then be only limited by the amount of time required by the PDs to send data to CD within the particular time interval. CD 610 may schedule times to send messages to PDs 620-X (e.g., at the beginning of communication intervals $T_1$, $T_2$, etc.), and receive communications from each PD 620-X. In certain wireless networks, e.g., mesh networks, it will be understood that different devices could act as CD 610 at different times. CD 610 may broadcast a message 812 to one or more PDs 620-X (e.g., PD 620-A, PD 620-B, etc.). Message 812 may include an indication of time of a future synchronous event. The indication of time, in some implementations, may be a delay time (e.g., delay time 834) or an event counter and a delay time. Message 812 may also include information, managed by CD 610, indicating a time and channel for each of PDs 620-X to communicate back to CD 610. Depending on network settings (e.g. implemented by CD 610), all PDs 620-X may be scheduled to send data to CD 610 at each communication interval, or only some of PDs 620-X may communicate with the CD 610 in a given communication interval. The indication of time for communication of a specific PD 620-X to CD 610 may be a time offset from the start of a particular communication interval to the time of communication by the PD 620-x, e.g., offset time A 828 for PD 620-A, offset time B 832 for PD 620-B, etc. Delays in communication and processing (such as t1) as well as other possible delays may be taken into account in a variety of ways, as described in conjunction with the above figures.

At their scheduled times, PDs 620-X may communicate messages 814 and 816 to CD 610. Messages 814 and 816 may contain empty packets (header-only packets, for instance), data from a recent (e.g., synchronous) measurement taken by devices associated with PDs 620-X, time stamps, or other information. In some cases, due to interference, noise, obstruction, or because of any other cause, one or more data packets transmitted by any of PDs 620-X may not be received by CD 610, as depicted in FIG. 8 by a cross drawn over message 814 from PD 620-A to CD 610.

When CD 610 detects that a scheduled message 814 from PD 620-A has not arrived, CD 610 may broadcast a subsequent message 818, e.g., at the beginning of the next communication interval T2. Message 818 may include similar data as message 812, e.g., an indication of time of a synchronous event 850 (delay time 836) and information facilitating communication of PDs 620-X to CD 610. Message 818 may also include a request that the lost data packet be replaced, e.g., that PD 620-A retransmit a copy of message 814. The contents of message 814 that did not reach CD 610 may then be retransmitted, e.g., PD 620-A may transmit a new message 822 at the communication time scheduled by CD 610, which may include the data lost in message 814. Implementations such as that depicted in FIG. 8 may be used when reliable data transfer from PDs 620-X to CD 610 is desired, when the wireless network has a substantial amount of noise and/or interference, when some of PD 620-X may be low-power devices, and in other instances.

Figure 9A:
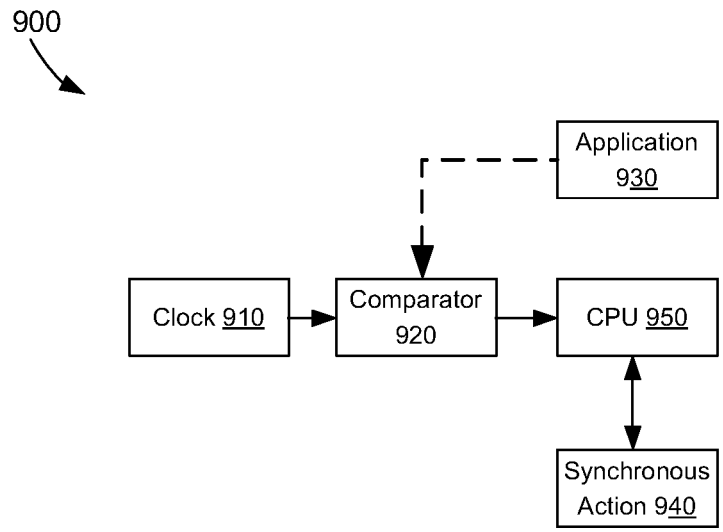
FIGS. 9A and 9B depict example triggering schemes for initiating a synchronous event in a wireless network, in accordance with some implementations.
Figure 9B:
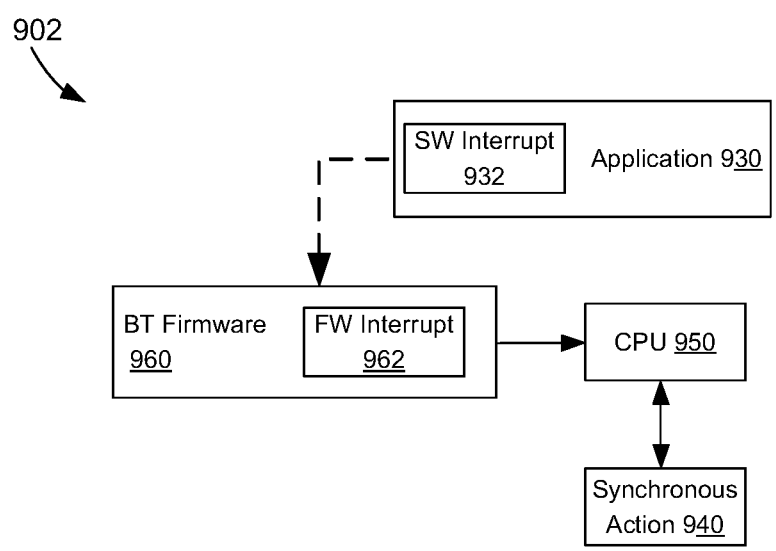

FIG. 9A and FIG. 9B depict example triggering schemes for initiating a synchronous event in a wireless network, in accordance with some implementations. Components (and operations thereof) illustrated in FIG. 9A and FIG. 9B may be implemented as part of a peripheral device of the wireless network. FIG. 9A illustrates a triggering scheme 900 that uses a hardware interrupt. After a message indicating a time of synchronous action is received by the PD from a CD, an application 930 instantiated on the PD may determine a future time of the synchronous action to be performed by the PD (e.g., as described above). Application 930 may configure a programmable comparator (e.g., a hardware comparator) 920 with the time of the synchronous action. The comparator 920 may be monitoring clock values output by a clock 910 of the PD, which may be synchronized with the clock of the CD (or other clocks in the network), e.g., using one of the methods described above. When the comparator 920 detects that the current clock value output by clock 910 matches (or exceeds) the time of the synchronous action (as programmed by application 930), comparator 920 outputs an interrupt signal to a central processing unit (CPU) 950 of the PD. The CPU 950 stops a current task being processed thereon and accesses a memory device (e.g., a register) with instructions that cause CPU 950 to perform a synchronous action 940 (e.g., to carry out measurements, initiate one or more operations, and so on) using the PD and/or one or more devices associated with the PD.

FIG. 9B illustrates a triggering scheme 902 that uses a firmware or a software interrupt. After a message indicating a time of synchronous action is received by the PD, application 930 instantiated on the PD may determine a time of the synchronous action and may configure a programmable firmware (FW) interrupt 962 within BT firmware 960. When BT firmware 960 determines that the time of the synchronous action has arrived, BT firmware 960 outputs an interrupt signal to CPU 950 and CPU 950 performs the synchronous action 940, as described above in relation to FIG. 9A. In some implementations, instead of programming FW interrupt 962, application 930 may program a software (SW) interrupt 932 (as depicted by the dashed box). At the time of the synchronous action, SW interrupt 932 outputs instructions to BT firmware 960 and BT firmware 960 communicates the interrupt signal to CPU 950.

Figure 10:
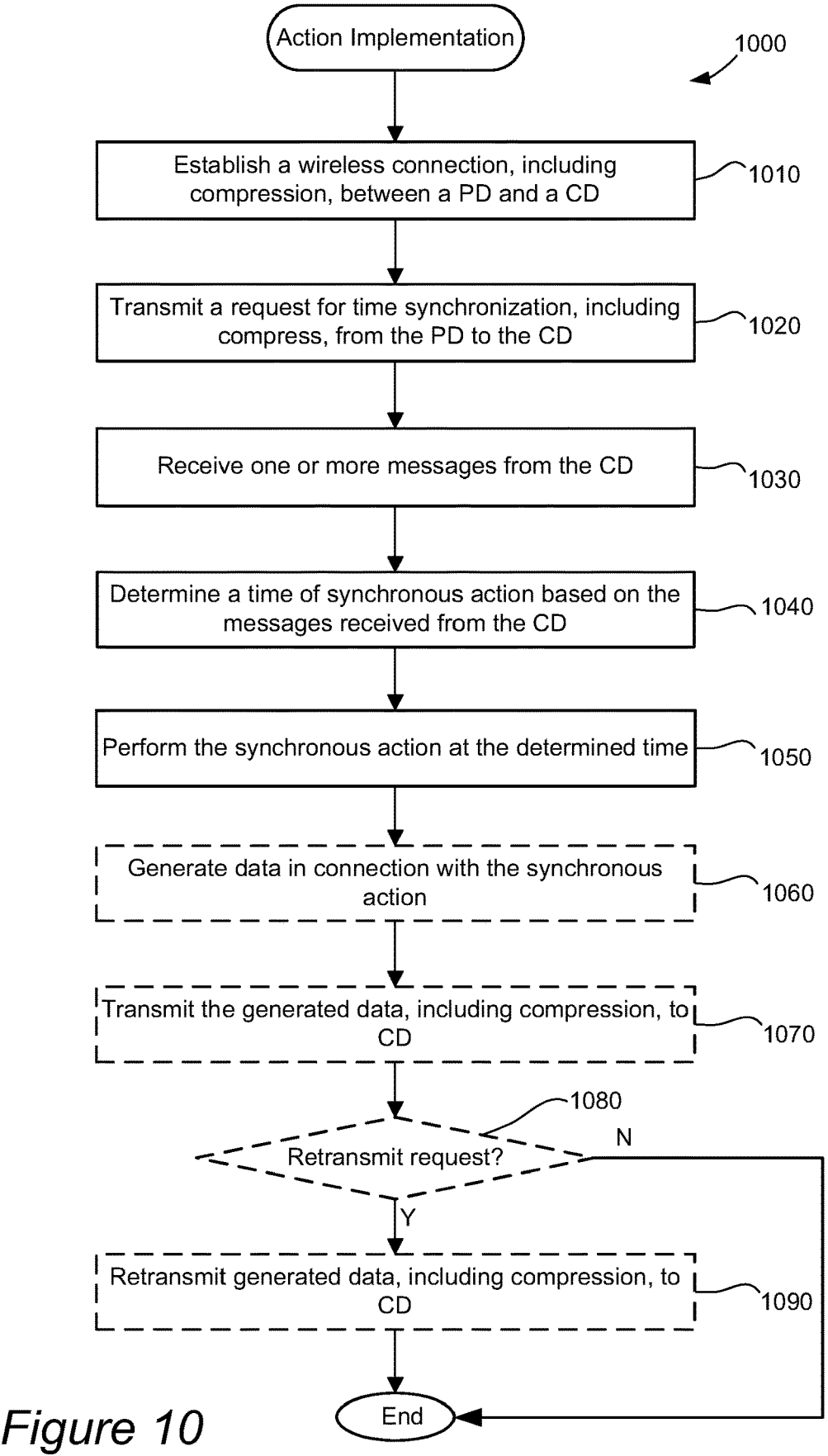
FIG. 10 is a flow diagram of an example method performed by a peripheral device of a WBMS to execute a synchronous action, according to some implementations.

FIG. 10 is a flow diagram of an example method 1000 performed by a peripheral device of a wireless network to execute a synchronous action, according to some implementations. At block 1010, a wireless connection between a PD) and a CD is established. The established connection may be via any suitable wireless communication network. In some implementations, the wireless communication network may be a BT network or a BLE network. In some implementations, the PD may have a two-way connection with the CD, e.g., a connection that allows the PD to receive and transmit data to the CD. In other implementations, there may be no communication connections formed between each of the PDs and the CD, so that the CD may instead broadcast messages (e.g., BT advertising messages) intended to be received by multiple PDs. Each or some of the PDs may be communicatively coupled to one or more associated devices.

In some implementations, at block 1020, the PD may send a time synchronization request to the CD. In response to receiving the time synchronization request, the CD may generate and transmit one or more messages that may include a time stamp of a reference time measured by the CD's internal clock and associated with the time the CD received the time synchronization request. In some implementations, the time when the CD received the request may be adjusted by the time it took the CD to process the request, to create the time stamp, and by other possible delays.

At block 1030, the PD receives, from the CD, the one or more messages generated and transmitted by the CD in response to receiving the time synchronization request. At block 1040, the PD determines a time of the synchronous action, in view of the received messages. More specifically, the synchronous action may be an action to cause one or more devices associated with the first CD to perform some function (e.g., take a measurement or perform any other operation), record a time stamp for a subsequent communication to the CD (or to other PDs), and so on. In the implementations where the CD records a time stamp (e.g., upon a request from the PD), the time of the synchronous action may be determined in view of the time stamp TS recorded by the CD and a connection interval (e.g., To) associated with a period of data exchange between the CD and the PD, as described in more detail above.

At block 1050, the synchronous action may be performed by the PD. The synchronous action would typically be performed concurrently by various other PDs of the network at the same time. In some implementations, the CD may also perform a similar (or different) action at the same time. The synchronous action may include each PD interacting with one or more of its associated devices, such as measuring devices, battery modules/cells, or any other suitable devices.

In some implementations, the PD (and, optionally, the CD) may generate data in connection with the synchronous action at block 1060. At block 1070, the PD may transmit the data generated in connection with the synchronous action to the CD, such as the data describing the measurement of the state of the devices associated with the first (second, etc.) PD. Prior to transmission, the data may be compressed and protected as described above.

The CD may not receive data from some or all of the PDs, for instance due to communication errors, interference, or the like. In some implementations, the CD may send a request to the PD(s) for a replacement data for the lost data. This request for the replacement data may be received by the first (second, etc.) PD at block 1080. Upon receiving the request, the PD may transmit, at block 1090, e.g., at the PD's next scheduled time to communicate with the CD, another data packet (or multiple data packets) that includes replacement data for the lost data.

Figure 11:
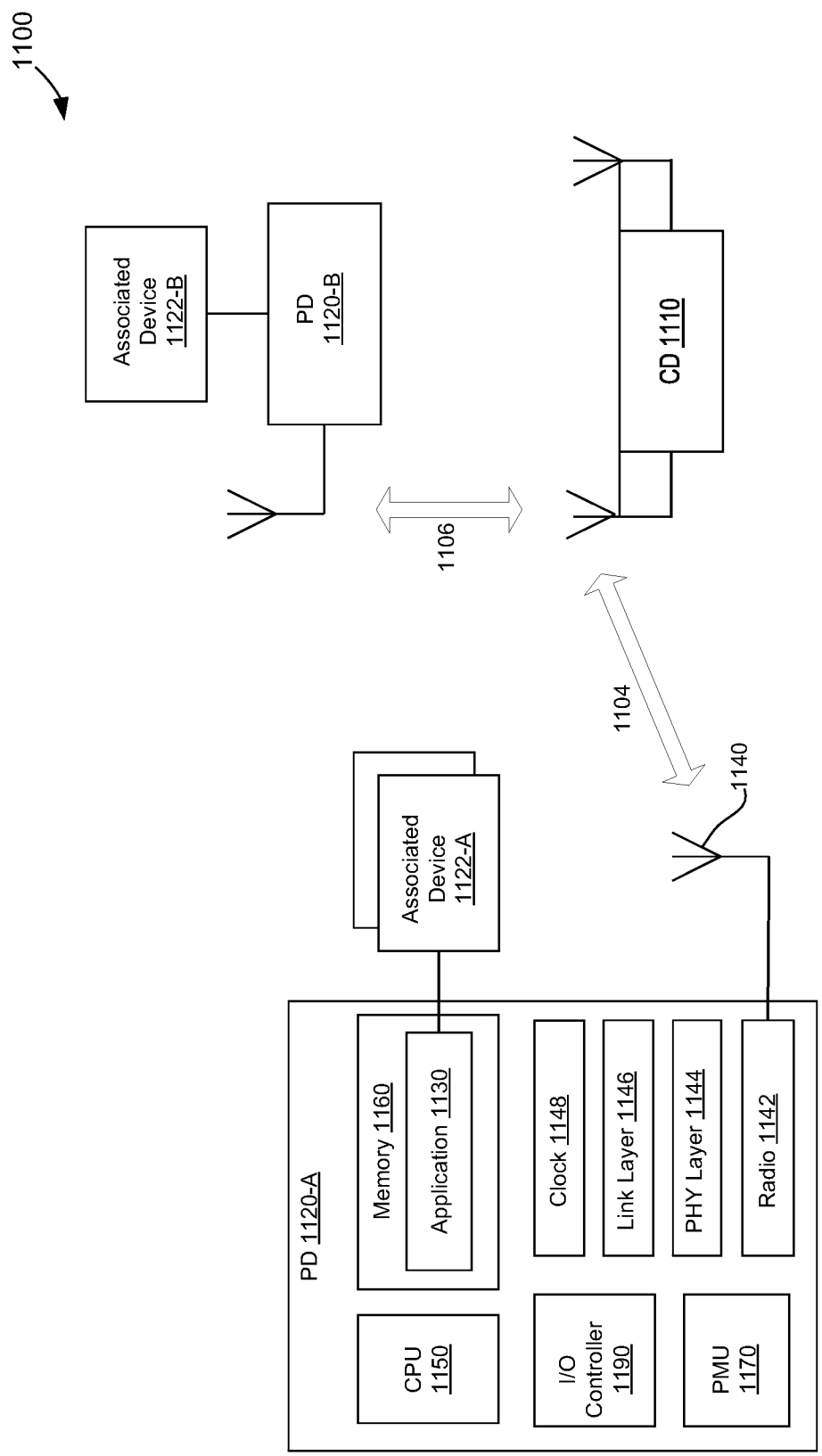
FIG. 11 is a diagram of a WBMS system in which battery management and synchronization techniques may be performed, according to some implementations.

FIG. 11 is a diagram of a wireless network system 1100 in which battery management and synchronization techniques may be performed, according to some implementations. Depicted is a CD 1110 that can support a wireless connection and data exchange with multiple PDs. Although two PDs 1120-A and 1120-B are shown for conciseness, wireless network system 1100 may include any number of PDs. Depicted are some components and modules of PD 1120-A, as discussed in more detail below. Although no internal structure is depicted for CD 1110 and PD 1120-B, it will be understood that some or all components of PD 1120-A may also be present in CD 1110, PD 1120-B, and other devices of the wireless network system 1100. Additionally, one or more of the modules and functions of PD 1120-A may be implemented in more than one physical device, such as in a BMU and a DPU or in a BMIC and a DPU.

CD 1110 may establish wireless connections 1104 and 1106 with PDs 1120-A and 1120-B, respectively, as indicated schematically with the arrows. Wireless connections 1104 and 1106 may be BT connections, BLE connections, or any other suitable connections. Some or all PDs may be associated with one or more devices, e.g., PD 1120-A may be associated (and communicatively coupled) with one or more devices 1122-A and PD 1120-B may be associated with device B 1122-B, as shown by the respective solid lines in FIG. 11. In some implementations, one or more PDs, e.g., PD 1120-A and/or PD 1120-B, may transmit a time synchronization request to CD 1110. Similarly, CD 1110 may communicate one or more messages to PD 1120-A and/or PD 1120-B. Each CD, PD, or a separate DPU may be also operable to perform compressions/decompression/protection for messages before they enter or after they exit the Black Channel.

Messages transmitted by CD 1110 may be in response to receiving the time synchronization requests from one or more PDs. The messages may be sent during separate connection events to each PD or may be broadcast to all (or multicast to a subset of) the PDs of the wireless network system 1100. The messages may include a time stamp associated with a reference time measured by the clock of CD 1110. The reference time may be a time associated with CD 1110 receiving a time synchronization request from one or more PDs 1120-A and/or 1120-B. The messages from CD 1110 to the PDs may include indications of time of a future synchronous action. The indications of time may be common to some or all of the PDs of the wireless network system 1100, or may be generated for individual PDs (or groups of PDs), e.g., in view of the communication schedule for communication of CD 1110 with various PDs of the wireless network system 1100.

PD 1120-A (and, similarly, PD 1120-B or any other PD of the wireless network system 1100) may be any device supporting the network connectivity and functionality (e.g., receiving, sending, and relaying data), such as a battery management unit (BMU), data processing unit (DPU), a battery management IC (BMIC), or any other type of network devices. PD 1120-A may support one or more applications 1130, which may be in the form of one or more modules (e.g., a software, firmware, hardware components, or any combination thereof) to perform battery management, battery measurement tasks, time synchronization, and/or facilitate synchronous action by PD 1120-A.

In some implementations, synchronous action by PD 1120-A is performed simultaneously with actions by other devices (e.g., by other PDs and/or CD of the wireless network system 1100). In some implementations, synchronous action by PD 1120-A may be performed non-simultaneously with actions performed by other devices but according to a predetermined pattern. For example, PD 1120-A may perform an action at a first predetermined time, PD 1120-B may perform another (or a similar) action at a second predetermined time (which may be earlier or later than the first predetermined time), and so on. Synchronization application 1130 on PD 1120-A may operate in conjunction with (e.g., receiving instructions from and providing data to) a similar application instantiated on CD 1110. Application(s) 1130 may comprise an industrial application, a vehicle application, a safety application, a measurement control application, a technical control and monitoring application, and the like. For instance, application(s) 1130 may generate time synchronization requests to CD 1110, receive from CD 1110 and process indications of the times of the synchronous actions, cause the associated device(s) 1122-A to perform one or more operations in conjunction with the synchronous action, collect data from the associated device(s) 1122-A, process and communicate the collected data (including replacement data) to CD 1110, and so on. Application(s) may be also configured to perform compressions/decompression/protection for messages before they enter or after they exit the Black Channel.

PD 1120-A (and other PDs and CD) may be capable of a wireless connectivity at a single radio band (e.g., 2.4 GHz band, 5 GHz, 60 GHz, etc.) or multiple bands (e.g., both 2.4 GHz and 5 GHz bands). PD 1120-A may use (or be connected to) one or more antennas 1140, to receive and transmit radio waves. In some implementations, antenna(s) 1140 may be or include a single multi-input multi-output (MIMO). A signal received by antenna(s) 1140 may be processed by a radio component 1142, which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 1140. Radio component 1142 may provide the received (and digitized) signals to a physical layer component (PHY) 1144.

PHY 1144 may convert the digitized signals into frames that can be fed into a Link Layer 1146. Link Layer 1146 may have a number of states, such as advertising, scanning, initiating, connection, and standby. Link Layer 1146 may transform frames into data packets. During transmission, data processing may occur in the opposite direction, with Link Layer 1146 transforming data packets into frames that are transformed by PHY 1144 into digital signals provided to radio component 1142. Radio component 1142 may convert digital signals into radio signals and transmit the radio signals using antenna(s) 1140. In some implementations, radio component 1142, PHY 1144, and Link Layer 1146 may be implemented as parts of a wireless controller, e.g., a wireless controller implemented as a single integrated circuit.

PD 1120-A (or other PD and CD devices) may include one or more CPU 1150. In some implementations, CPU 1150 may include one or more finite state machines (FSMs), field-programmable gate arrays (FPGAs), application-specific integrated circuits (ASIC), or the like. PD 1120-A may have a single processor that executes various operations related to synchronization operations together with other processes that may be running on PD 1120-A. In some implementations, PD 1120-A may have a dedicated processor for synchronization operations that is separate from other processes and applications running on PD 1120-A. PD 1120-A may further include a memory device 1160, which may be (or include) non-volatile, e.g., read-only (ROM) memory, and volatile, e.g., random-access (RAM), memory. Memory device 1160 of PD 1120-A may also store codes and supporting data for application(s) 1130.

PD 1120-A may further include a clock 1148 and power management unit (PMU) 1170, which may manage clock/reset and power resources. PD 1120-A may further contain an input/output (I/O) controller 1190 to enable communications with other external devices and structures, including associated device9s) 1122-A. In some implementations, I/O controller 1190 may enable a general purpose I/O (GPIO) interface, a USB interface, a PCM digital audio module, and other I/O components.

Because such information and program instructions may be employed to implement the systems/methods described herein, the present disclosure relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing disclosure has been described in some detail for purposes of clarity of understanding, it will be apparent that certain changes and modifications may be practiced within the scope of the appended claims. It should be noted that there are many alternative ways of implementing the inventive processes, systems, and apparatus. Accordingly, the present embodiments are to be considered as illustrative and not restrictive, and the scope of the inventive subject matter is not to be limited to the details given herein.

What is claimed is:

1. A wireless battery management system, comprising:
   a plurality of peripheral devices (PDs), each coupled to a battery module of a plurality of battery modules having a plurality of associated battery cells and operable to receive a plurality of battery measurements from such associated cells;
   a central device (CD) operable to receive the plurality of battery measurements from the plurality of PDs via a wireless network;
   a first data processing unit (DPU) coupled with a first one of the plurality of PDs and communicatively interposed between the first PD and the wireless network, wherein the first DPU is operable to:
      receive a first data packet from the first PD,
      if the first data packet passes verification, compress the first data packet and add a protection code to the first data packet such that the first data packet comprises compressed battery measurement data and the protection code, and
      send the compressed first data packet with the protection code to a second DPU via the wireless network of wireless transceivers; and
   the second DPU being coupled with the CD and communicatively interposed between the CD and the wireless network, the second DPU being operable to:
      from the wireless network, receive the compressed first data packet with the protection code,
      if the compressed first data packet passes verification, decompress the compressed first data packet to obtain the first data packet and associated battery measurement data, and send the decompressed first data packet and the battery measurement data to the CD.

2. The wireless battery management system of claim 1, wherein the plurality of PDs, the CD, the first DPU, and the second DPU meet the requirements of the Automotive Safety Integrity Level (ASIL) D protocol, wherein the CD comprises the second DPU and the first PD comprises the first DPU.

3. The wireless battery management system of claim 1, wherein
the first data packet received by the first DPU includes a protection code in the form of an original CRC code,
the first DPU is also operable to determine whether the first data packet passes verification by generating a new CRC code from the first data packet's contents and comparing such new CRC code to the original CRC code,
the protection code generated by the first DPU for the compressed first data packet is in the form of an original cyclic redundancy check (CRC') code, and
the second DPU is operable to determine whether the compressed first data packet passes verification by generating a new CRC' code from the compressed first data packet's compressed contents and comparing such new CRC' code to the original CRC' code.

4. The wireless battery management system of claim 1, wherein the first PD is operable to send multiple first data packets in case one or more of the first data packets are lost during transmission.

5. The wireless battery management system of claim 1, wherein the first DPU is operable to send a request to the first PD for resending the first data packet if verification fails for such first data packet.

6. The wireless battery management system of claim 1, wherein the first data packet received by the CD from the second DPU is identical to the first data packet sent by the first PD.

7. The wireless battery management system of claim 1, forming part of an electric or hybrid vehicle.

8. The wireless battery management system of claim 1, wherein each battery module is stored for later deployment in an electric or hybrid vehicle.

9. The wireless battery management system of claim 1, wherein
specific ones of a plurality of other DPUs are coupled with specific other ones of the plurality of PDs and communicatively interposed between each of the other PDs and the wireless network of wireless transceivers,
the other DPUs are operable to:
receive a plurality of other data packets from their associated PDs,
compress such plurality of other data packets and add a protection code to such plurality of other data packets, and
send the compressed other data packets with their protection codes to the second DPU via the wireless network, and
the second DPU is further operable to repeat the operations for receiving, decompressing, and sending with respect to the compressed other data packets.

10. The wireless battery management system of claim 9, wherein the first data packet and the other data packets comprise a plurality of battery measurements for the plurality of cells of the plurality of battery modules.

11. The wireless battery management system of claim 10, wherein the plurality of battery measurements comprise an average measurement for each of the battery modules' battery cells and a deviation from such average measurement for each of the battery modules' battery cells.

12. The wireless battery management system of claim 10, wherein the plurality of battery measurements comprises a first measurement for a first one of each of the battery modules' battery cells and a deviation from such first measurement for each of the battery modules' other battery cells.

13. The wireless battery management system of claim 10, wherein the CD is further operable to:
send one or more messages to each of the plurality of PDs to facilitate performance of a synchronous action comprising an interaction of each of the plurality of PDs with their respective one or more of the associated battery modules, wherein the one or more messages comprise a time stamp associated with a reference time, measured by a clock of the CD; and
receive the first and other data packets from the plurality of PDs, wherein each of the first and other data packets is generated, in connection with the synchronous action performed by each of the plurality of PDs or a device associated with such PD.

14. The wireless battery management system of claim 10, wherein the CD is further operable to:
send a first message to the first PD of the plurality of PDs, the first message comprising a first indication of time of the synchronous action, the first indication of time defined relative to a predefined first communication time for the first PD;
send a second message for a second PD of the plurality of PDs, the second message comprising a second indication of time of the synchronous action, the second indication of time defined relative to a predefined second communication time for the second PD, the second communication time being different than the first communication time; and
receive the first and other data packets from the first and second PDs, wherein each of the first and other data packets is generated, in connection with the synchronous action performed by each of the first and second PD or a device associated with such first and second PD.

15. The wireless battery management system of claim 1, wherein the plurality of PDs, the CD, the first and second DPU, and the wireless network of wireless transceivers are each coupled with a mesh network.

16. A method for managing wireless communication in a battery management system comprising a plurality of peripheral devices (PDs) coupled to a plurality of battery modules, a central device (CD), a first data processing unit (DPU), and a second DPU, the method comprising:
at the first DPU, receiving a first data packet from the first PD of the plurality of PDs;
at the first DPU determining that the first data packet passes verification, and responsive to the determination, compressing the first data packet and adding a protection code to the first data packet such that the first data packet comprises compressed battery measurement data and the protection code;
from the first DPU, sending the compressed first data packet with the protection code and compressed battery measurement data to the second DPU via a wireless network;
at the second DPU, receiving the compressed first data packet with the protection code and compressed battery measurement data;

at the second DPU determining that the compressed first data packet passes verification, and responsive to the determination decompressing the compressed first data packet to obtain the first data packet and associated battery measurement data; and from the second DPU, sending the decompressed first data packet and the battery measurement data to the CD.

17. The method of claim 16, wherein the plurality of PDs, the CD, the first DPU, and the second DPU meet the requirements of the Automotive Safety Integrity Level (ASIL) D protocol.

18. The method of claim 16, further comprising the first PD sending multiple first data 15 packets in case one or more of the first data packets are lost during transmission.

19. The method of claim 16, further comprising:
at each of a plurality of other DPUs, receiving a plurality of other data packets from associated other ones of the plurality of PDs;
at each of the other DPUs, compressing such plurality of other data packets and adding a protection code to such plurality of other data packets, and
at each of the other DPUs, sending the compressed other data packets with their protection codes to the second DPU via the wireless network, and at the second DPU, repeating the operations for receiving, decompressing, and sending with respect to the compressed other data packets.

20. The method of claim 19, wherein the first data packet and the other data packets comprise the plurality of battery measurements for a plurality of cells of a plurality of battery modules, wherein the plurality of battery measurements comprises a first measurement for a first one of each of the battery modules' battery cells and a deviation from such first measurement for each of the battery modules' other battery cells.

21. The method of claim 19, wherein the first data packet and the other data packets comprise the plurality of battery measurements for a plurality of cells of a plurality of battery modules, wherein the plurality of battery measurements comprises at least a first measurement value for a first one of the battery modules' battery cells and a deviation from a previous measurement value for a second one of the battery modules' battery cells.

* * * * *